US006848161B1

(12) United States Patent  
Folino et al.

(10) Patent No.: US 6,848,161 B1
(45) Date of Patent: Feb. 1, 2005

(54) GASKET INSTALLATION APPARATUS

(75) Inventors: Salvatore J. Folino, Willowdale (CA); Peter J. Vert, Maple (CA); Cecil Beauman, Hawkesville (CA)

(73) Assignee: Tesma International Inc., Concord (CA)

( * ) Notice: Subject to any disclaimer, the term of this patent is extended or adjusted under 35 U.S.C. 154(b) by 0 days.

(21) Appl. No.: 09/913,233
(22) PCT Filed: Feb. 10, 2000
(86) PCT No.: PCT/CA00/00128

§ 371 (c)(1),
(2), (4) Date: Mar. 31, 2003

(87) PCT Pub. No.: WO00/47364

PCT Pub. Date: Aug. 17, 2000

Related U.S. Application Data

(60) Provisional application No. 60/119,390, filed on Feb. 10, 1999.

(51) Int. Cl.⁷ .............................. B23P 11/02; B23P 19/02
(52) U.S. Cl. .............................. 29/451; 29/450; 29/453; 29/235

(58) Field of Search .......................... 29/428, 450, 451, 29/453, 235; 277/590

(56) References Cited

U.S. PATENT DOCUMENTS 4,203,191 A  *  5/1980  Gibson, Sr. .................. 29/451

* cited by examiner

*Primary Examiner*—John C. Hong
(74) *Attorney, Agent, or Firm*—Clark Hill PLC

(57) ABSTRACT

An apparatus (50) and method for inserting a gasket (32) Into a channel (28) of a mating part (20). The apparatus includes a gasket carrier (66) having a convexly carved surface with a groove (78) therein for receiving a base (34) of the gasket. The groove registers with the channel to feed the gasket into the channel in response to relative rocking movement between the part and the surface. According to the method, a gasket is placed in the groove and the gasket carrier it juxtaposed with the part to align the gasket with the channel. The part and the gasket carrier are moved toward each other for a portion of the gasket to enter the channel. A relative rocking movement is caused between the part and the gasket carrier to transfer the remainder or the gasket to the channel.

20 Claims, 10 Drawing Sheets

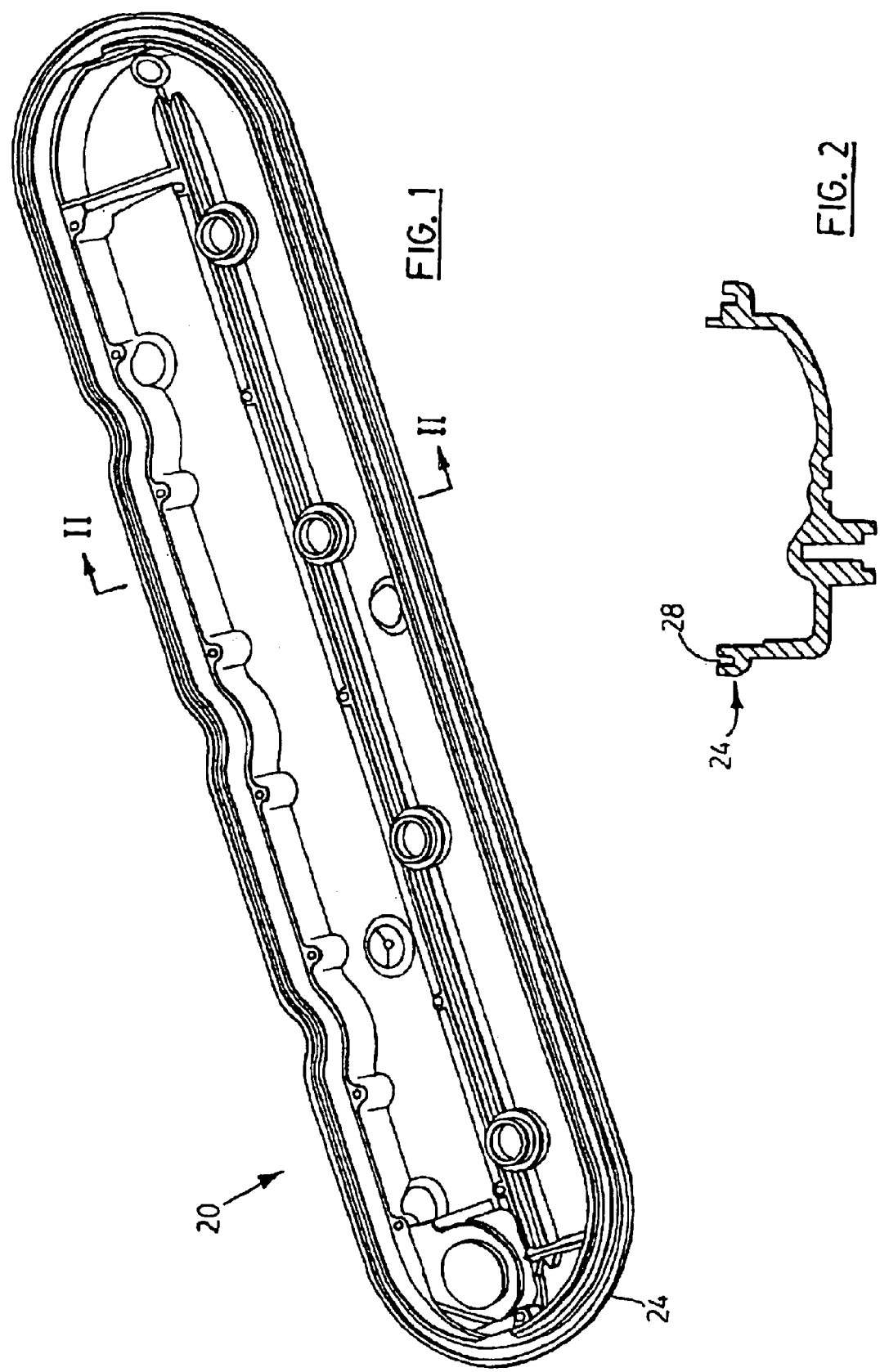

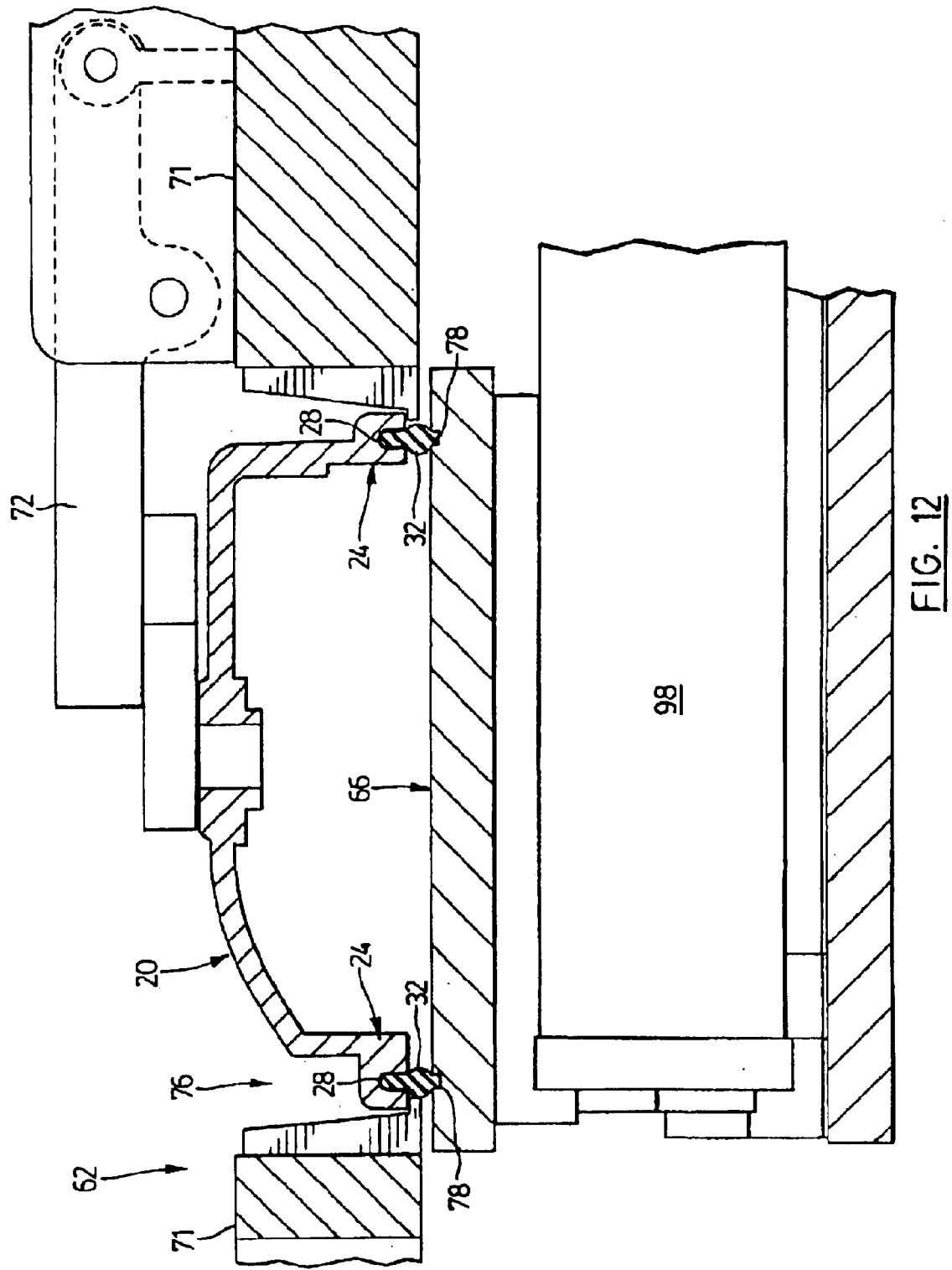

GASKET INSTALLATION APPARATUS

This application is a 371 of PCT/CA00/00128 filed Feb. 10, 2000, and claims benefit of 60/119,390 filed Dec. 10, 1999.

FIELD OF THE INVENTION

This invention relates to an apparatus for installing gaskets. In particular, this invention relates to an apparatus for installing an elastomeric gasket into a channel on a component.

BACKGROUND OF THE INVENTION

In an automobile engine, it is common to use an endless gasket between mating parts such as a valve cover and a cylinder head. An endless channel is provided on one or both of the mating surfaces to receive and retain an endless gasket. The gasket is inserted into the channel before final assembly of the valve cover to the cylinder head.

Installation of gaskets into the endless channel can pose many problems. Traditionally, an operator starts the installation of the gasket by placing the gasket over the channel. Next, the operator starts pressing the gasket into the channel. The operator must ensure that the insertion of the gasket is even. However, due to the elastomeric nature of the gasket, the operator commonly "chases" the gasket, as previously inserted portions of the gasket pop out of the channel as the uninstalled portions of the gasket are being inserted. Further, slight stretching of the gasket during installation can result in misalignment of the gasket within the channel.

It is known in the art to provide a flat gasket carrier which releasably receives a gasket for insertion into the endless channel. The endless channel is aligned with the gasket and direct pressure is applied to the gasket carrier to insert the gasket into the channel. However, a slight misalignment of the part with the gasket causes any misaligned portions of the gasket to buckle and remain uninserted. Furthermore, air gets trapped between the gasket and the channel and tends to push the gasket out of the channel upon removal of the installation force.

Various gasket installation and assembly procedures have been proposed in the prior art. A simple approach, disclosed in U.S. Pat. No. 4,101,138, uses friction to seat an elastomeric gasket, and locating pins integral to the gasket that are slightly larger than the mating holes on the engine part, SD that the gasket is force fitted into place during engine part assembly. However, no provision is made for avoiding misalignment during initial installation of the gasket. v), the part may be held stationary and the relative rocking movement carried out by the gasket carrier.

An apparatus is also provided for applying an elastomeric gasket to a part having a channel extending into a face thereof for receiving and at least frictionally engaging the gasket. The apparatus has a gasket carrier with a convexly curved surface with a groove therein for receiving a base of the gasket. The groove registers with the channel to feed the gasket into the channel in response to relative rocking movement between the part and the surface. The apparatus may include a part holder for grasping the part and presenting the channel to the gasket carrier.

The apparatus may also include a driver operably connected to at least one of the part holder and the gasket carrier for effecting the relative rocking movement. The driver may be connected to the gasket carrier.

The part holder may include an opening for receiving the part and an inwardly extending flange extending at least part way around the opening for abutting against the base of the part outboard of the channel to support the part within the opening. At least one clamping member may be provided which is moveable between a load position allowing placement and removal of the part within the opening, and a hold position engaging the part to hold the part within the opening end against the flange.

The driver may include a platen moveable in a longitudinal direction toward and away from the part holder, a base plate rockingly coupled to the platen for supporting the gasket carrier, and a connector for connecting the gasket carrier to the base plate. First positioning means may be connected to the platen for moving the platen in the longitudinal direction. A rocker may act between the base plate and the platen for causing the base plate and in turn the gasket carrier to effect the rocking movement relative to the part holder.

The rocker may include first and second cam plates extending from the platen respectively toward first and second ends of the platen. The first and second cam plates may have respective first and second cam surfaces engaged by respective first and second cam followers connected to the base plate. The first and second cam surfaces may be profiled to allow opposite relative longitudinal movement of the first and second ends of the base plate while restraining lateral movement An arched guide may be secured to and extend laterally across the base plate, the arched guide having a curvature complementary to the curved surface. A slider may be provided which is slidable along the guide by a slider positioning means acting between the slider and the platen to laterally position the slider relative to the guide. The slider may act in conjunction with the first and second cam plates and the first and second cam followers to translate lateral movement of the slider to the rocking movement of the gasket carrier.

The gasket carrier may be slidably connected to the base plate for lateral movement relative to the part holder. The apparatus may further include a second positioning means acting between the platen and the base plate to laterally slide the platen clear of the part holder for placement of the gasket in the groove.

The first and second positioning means may be fluid pressure responsive cylinders.

BRIEF DESCRIPTION OF THE DRAWINGS

Presently preferred embodiments of the invention will now be described, by way of example only, with reference to the attached figures wherein:

FIG. 1 is a perspective view of an engine valve cover,

FIG. 2 is a section view through line II—II in FIG. 1;

FIG. 12 is a section view through line XII—XII in FIG. 10.

DETAILED DESCRIPTION OF THE DRAWINGS

Referring to FIGS. 1 and 2, a part such as a valve or a cam cover for covering a cylinder head of an automobile engine is indicated generally at 20. Valve cover 20 is conventional in the art and is generally concave with a sealing surface 24 extending about the periphery of the valve cover 20. As illustrated in FIG. 2, sealing surface 24 has a channel 28 for receiving a gasket. Although a valve or cam cover is illustrated and described herein, it will be appreciated that this invention has general applicability to other parts, automotive or otherwise in which an elastomeric gasket is to be installed in a channel.

Figure 3:
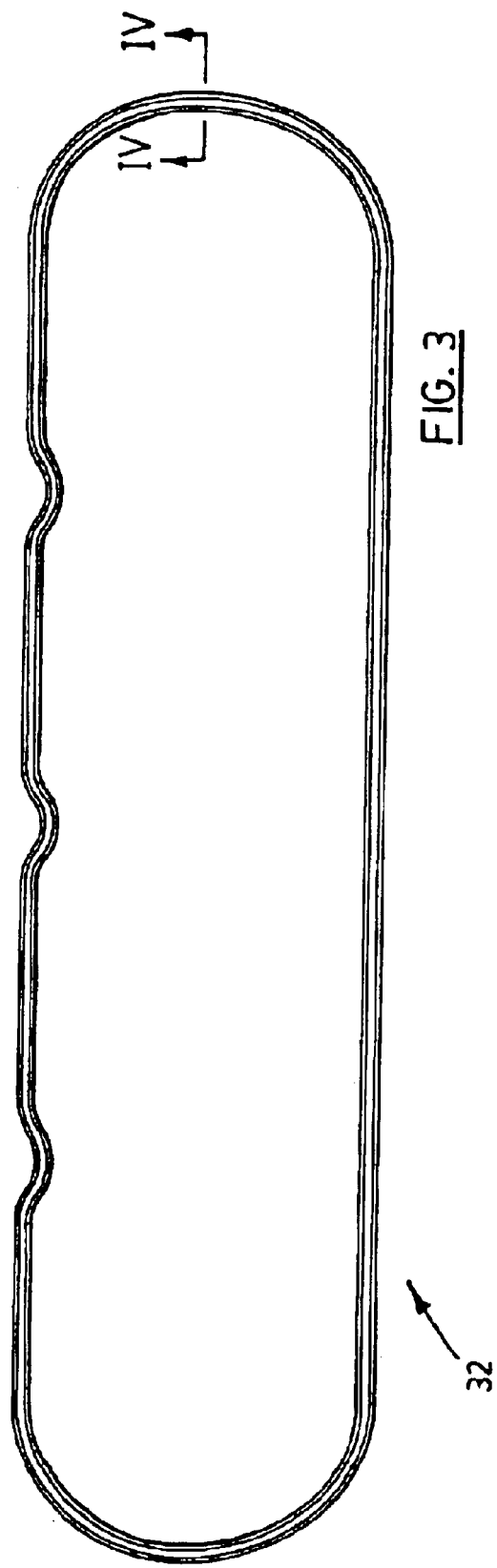
FIG. 3 is an elevational view of an engine valve cover gasket.
Figure 4:
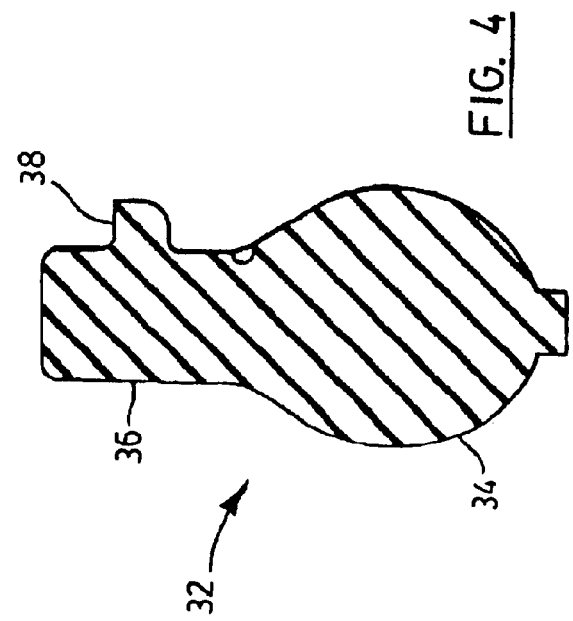
FIG. 4 is a section view through line IV—IV of the gasket shown in FIG. 3.

Referring now to FIGS. 3 and 4, a gasket 32 for sealing between valve cover 20 and the cylinder head of the automobile engine is illustrated. Gasket 32 is flexible and preferably formed from silicone or a silicone based composition. It is to be understood that gasket 32 can be formed from other elastomeric materials. As best seen in FIG. 4, gasket 32 may have a uniform cross section comprising a generally key-hole shape. However other shapes, such as a simple "O" ring gasket may also be installed according to the present invention. The key-hole shape has a bulbous base portion 34, an insertion flange 36 and a lateral flange 38. Insertion flange 36 is sized to friction fit within channel 28. To assist in the friction fit, lateral flange 38 impinges on the inner surface of channel 28, thus ensuring retention of insertion flange 36 within channel 28. Bulbous portion 34 presents a sealing bead about the periphery of the valve cover 20 for sealing engagement with a mating surface such as a cylinder head.

Figure 5:
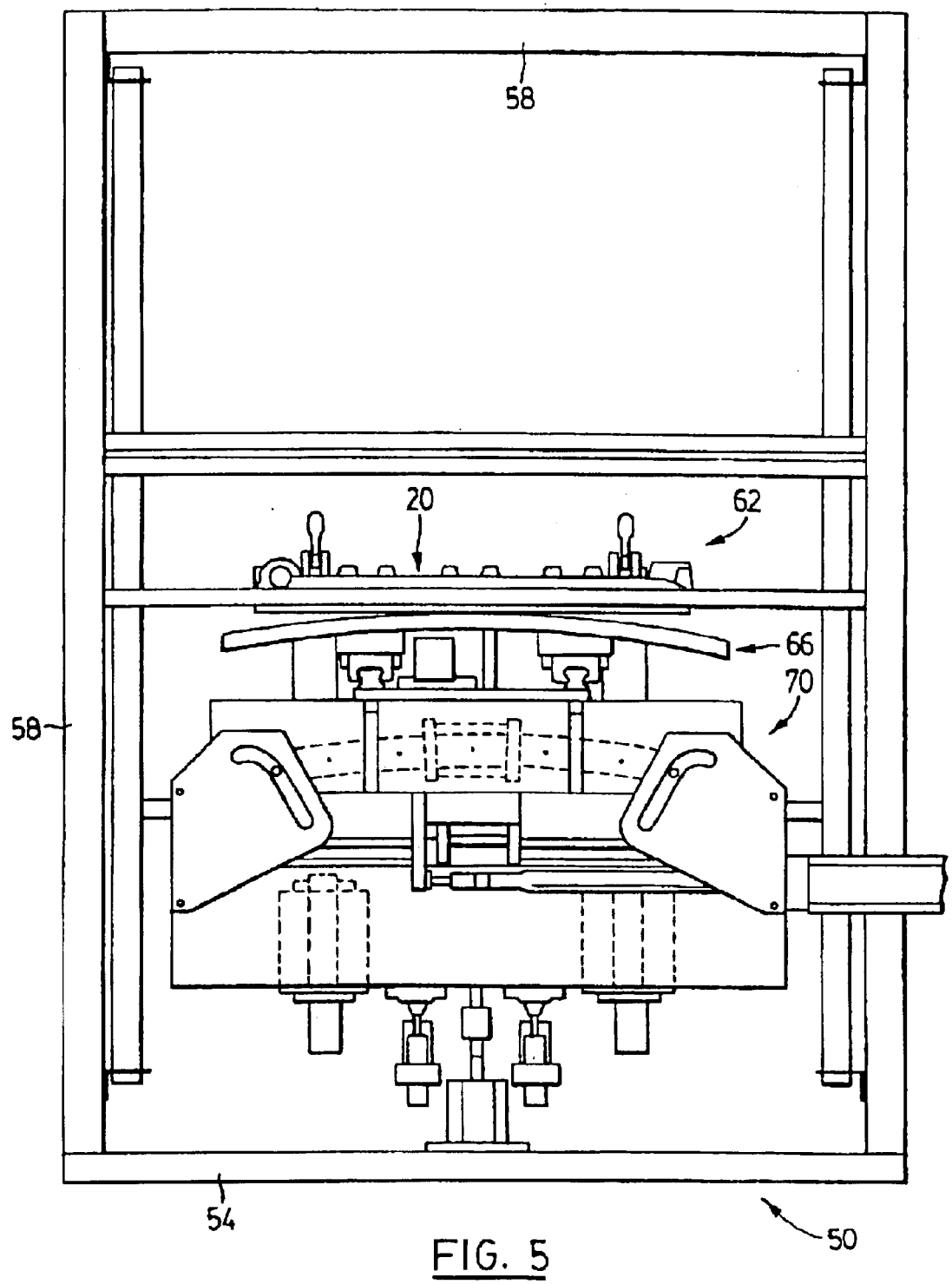
FIG. 5 is a front elevational view of a gasket assembly station.

FIG. 5 shows a first embodiment of a gasket installation apparatus in accordance with the present invention, indicated generally at 50, for installing gasket 32 into valve cover 20. Apparatus 50 comprises a base 54 on which a structural frame 58 having frame members defining a parallelepiped structure is mounted. A part holder 62 is mounted to frame 58 and suspended over a gasket carrier 66 and a driver or gasket applicator 70.

Figure 6:
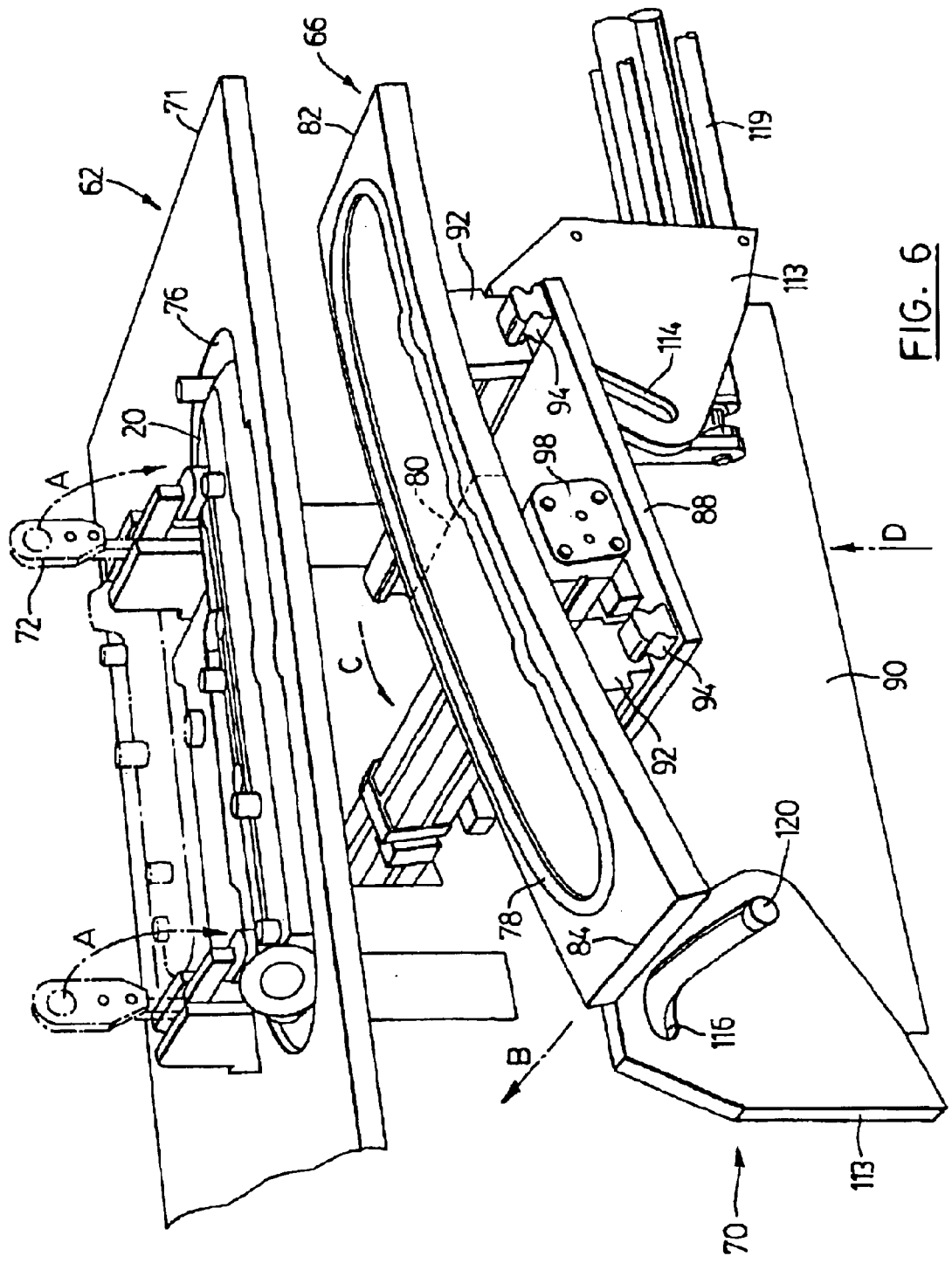
FIG. 6 is a perspective view of gasket assembly machinery within the station shown in FIG. 5.

Part holder 62 will now be described with reference to FIGS. 6 and 12. Part holder 62 comprises a plate 71 and swing clamps 72. Plate 71 is affixed to opposite sides of frame 58. Plate 71 has an opening 76 for receiving valve cover 20. A flange 73 extends inwardly about the inner periphery of opening 76 to support the outer periphery of cover 20 in a channel-side down condition. The flange 73 engages cover 20 without interfering with or obstructing channel 28. The flange 73 need not be continuous. Clamps 72 are pivotally mounted and swing over the opening 76, so as to clamp cover 20 between the clamps 72 and the flange 73 thereby securely retaining cover 20 within opening 76. Preferably, swing clamps 72 are pneumatically-driven, and are movable between a release position and a hold position as shown by arrow A in FIG. 6.

Gasket carrier 66 will now be described with reference to FIGS. 6–11. Gasket carrier 66 is a curved plate having a groove 78 on the convex surface thereof. Groove 78 has the same general outline as the channel 28 so as to register therewith and is complementary to the base portion 34 of the gasket 32, The groove 78 receives the base portion 34 so as to present insertion flange 36 toward channel 28. As best seen in FIG. 9, the curvature of carrier 66 provides an angle of α between a line tangent to a centre 80 and a line tangent to a first end 82, and an angle of β between a line tangent to centre 80 and a line tangent to second end 84. α and β can be in the range from about 11° about 22°. Preferably, α and β should be in the range of from about 12° to about 19°. However, the preferred embodiment has α=about 14° and β=about 14°. It will be understood that other curvatures can be provided which will facilitate the insertion of the gasket, and that α need not be equal to β, and that the exact curvature used will depend on the particular geometry of the part and gasket to be installed.

Gasket applicator 70 will now be described with reference to FIGS. 6–10. As will now be apparent to those of skill in the art, gasket applicator 70 attaches to gasket carrier 66 and provides a means to insert gasket 32 into groove 78 by rocking gasket carrier 66 along channel 28. As best seen in FIG. 6, gasket applicator 70 interfaces with carrier 66 via a base plate 88 to which gasket carrier 66 is slidably mounted. A pair of runners 92 mounted to the bottom of carrier 66 slidably grasp a pair of rails 94 affixed to base plate 88. Drive cylinder 98 is affixed to base plate 88 and the gasket carrier 66 so as to act between the platform 88 and the carrier 66. The drive cylinder 98 acts as a second positioning means to effect transverse movement of the gasket carrier 66 as indicated by arrow B. Gasket carrier 66 can be placed in a load position transversely distal from plate 71 (best seen in FIG. 6), to a ready position such that gasket carrier 66 aligns with opening 76 (best seen in FIGS. 9–11). Base plate 88 includes a depending carrier base 90 and is mounted to a platen 129 in such a manner that base plate 88 carrier, base 90 and carrier 66 can pivot about a transverse axis as indicated by arrow C, and slide longitudinally as indicated by arrow D.

Referring now to FIGS. 6–11, first and second cam plates 113 are mounted on opposite ends of the platen 129. A drive cylinder 119 mounted to frame 58 moves between a retracted position and an extended position to act as a slider positioning means to effect guided movement of the carrier base 90. Pins 118, 120 are integral with and project from carrier base 90 in a vertical direction. Guide slots 114, 116 are generally "J" shaped slots which are canted away from each other. Guide slots 114, 116 act as cam surfaces and receive pins 118, 120 which act as cam followers and cooperate with drive cylinder 119 to direct the pivotal movement of gasket carrier 66.

Figure 7:
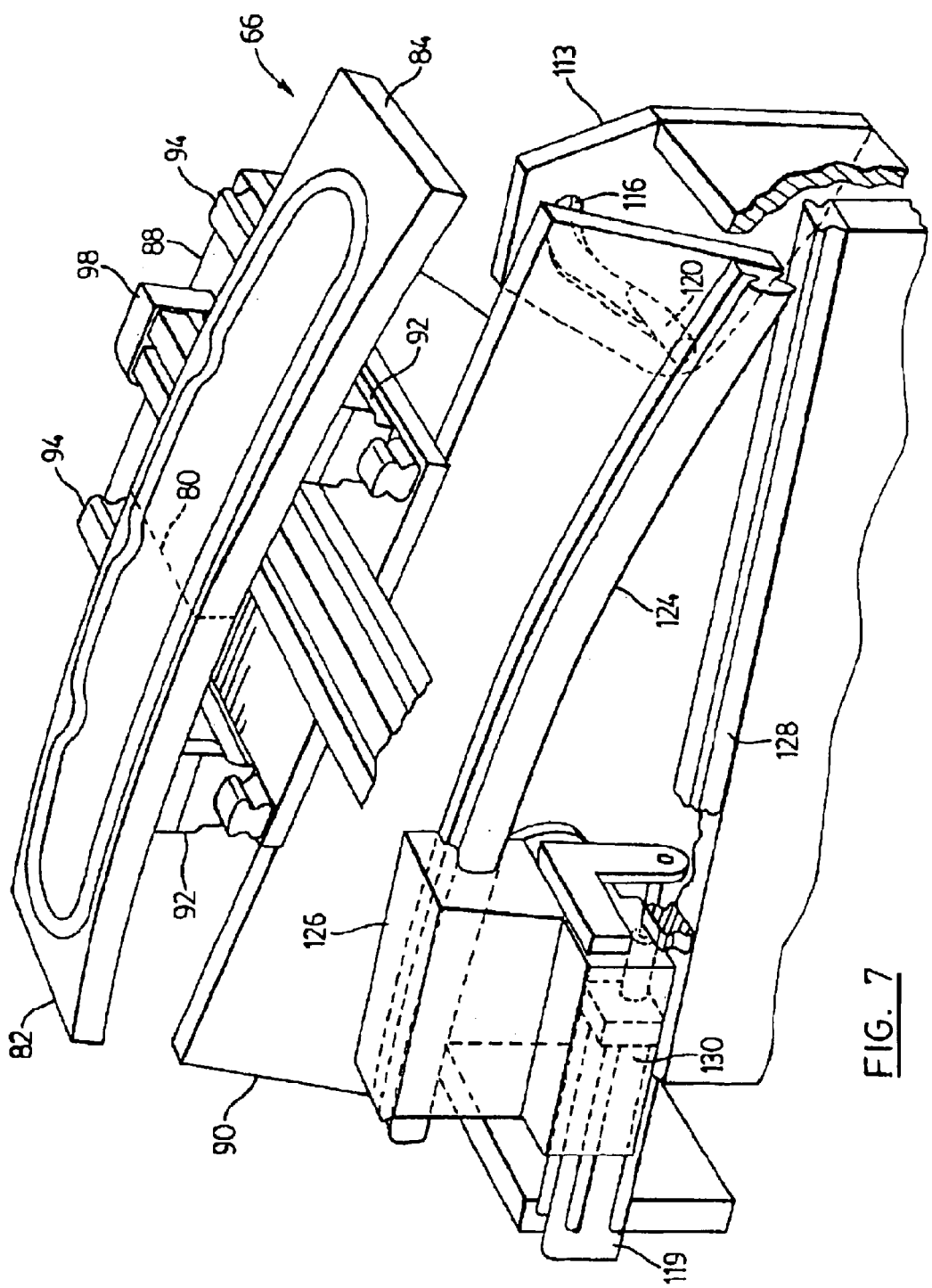
FIG. 7 is a partial rear perspective view of the gasket assembly station shown in FIG. 6.

As best seen in FIG. 7, the rear face of base plate 88 has an arcuate rail 124 similar to rails 94. Arcuate rail 124 has a curvature that is generally coincident with the curvature of gasket carrier 66 and acts as a guide for a slider 126 which, similar to runners 92, is affixed to the end of cylinder 119 and slidably grasps arcuate rail 124 for slidable movement therealong. On the underside of carrier base 90 is a second rail 128, also similar to rails 94, mounted to platen 129. A second runner 130, also similar to runners 92, is also affixed to the end of cylinder 119 underneath runner 126. Second runner 130 slidably grasps rail 128 for slidable movement therealong.

Figure 8:
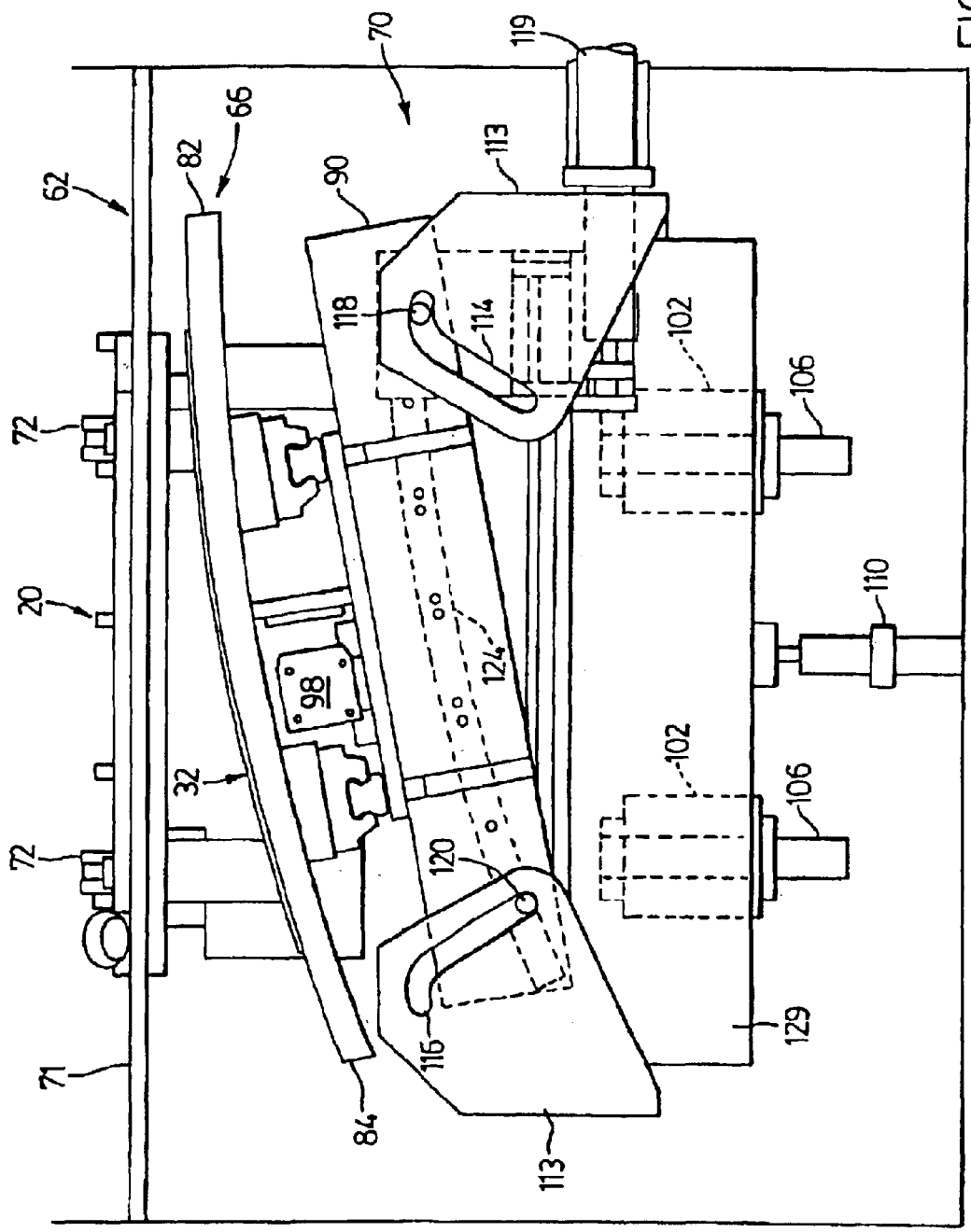
FIG. 8 is a front elevational view of the gasket assembly station as shown in FIG. 6.
Figure 9:
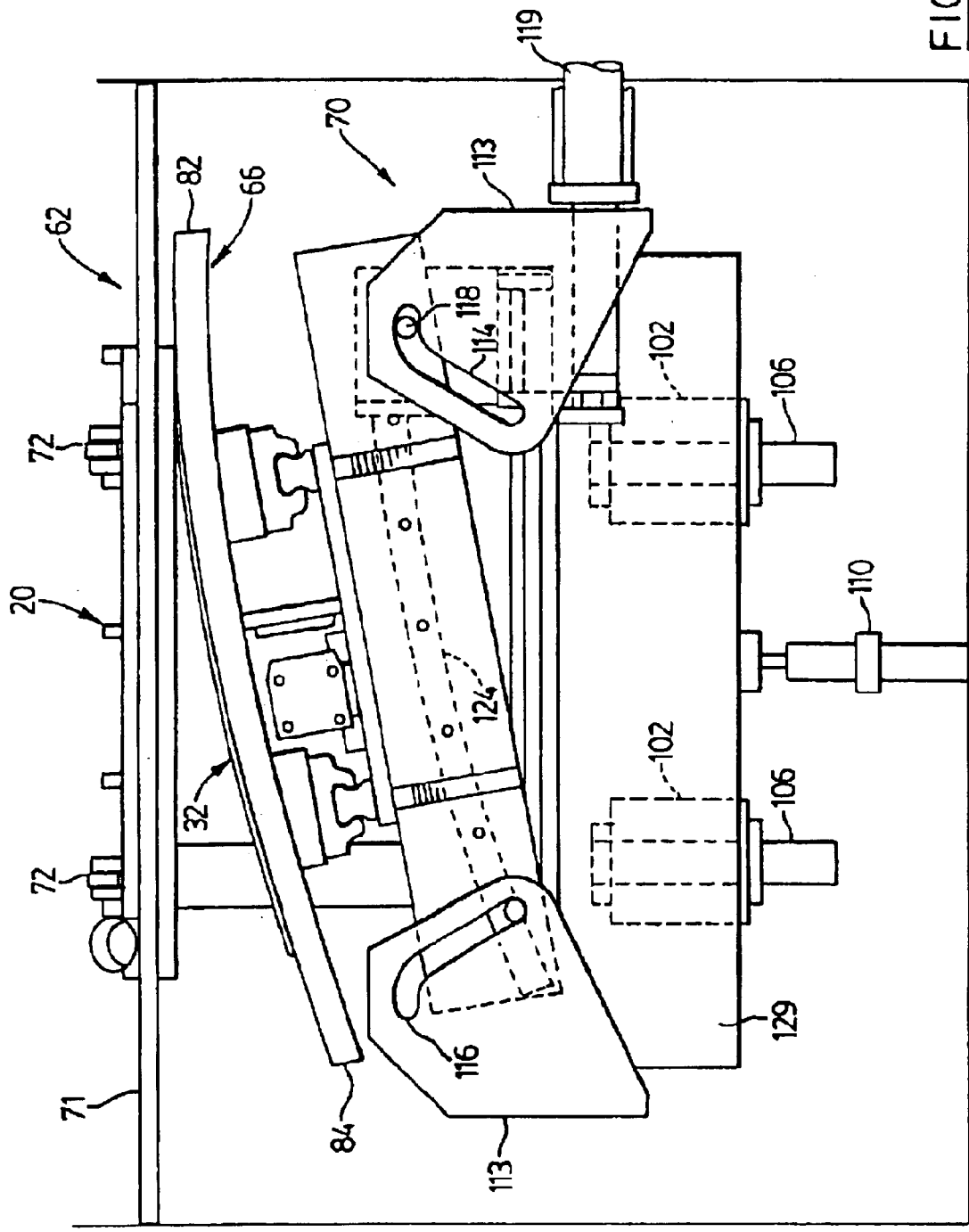
FIG. 9 is a front elevational view of the gasket assembly station shown in FIG. 6 with the gasket carrier in engagement with the first end of the valve cover of FIG. 1.
Figure 10:
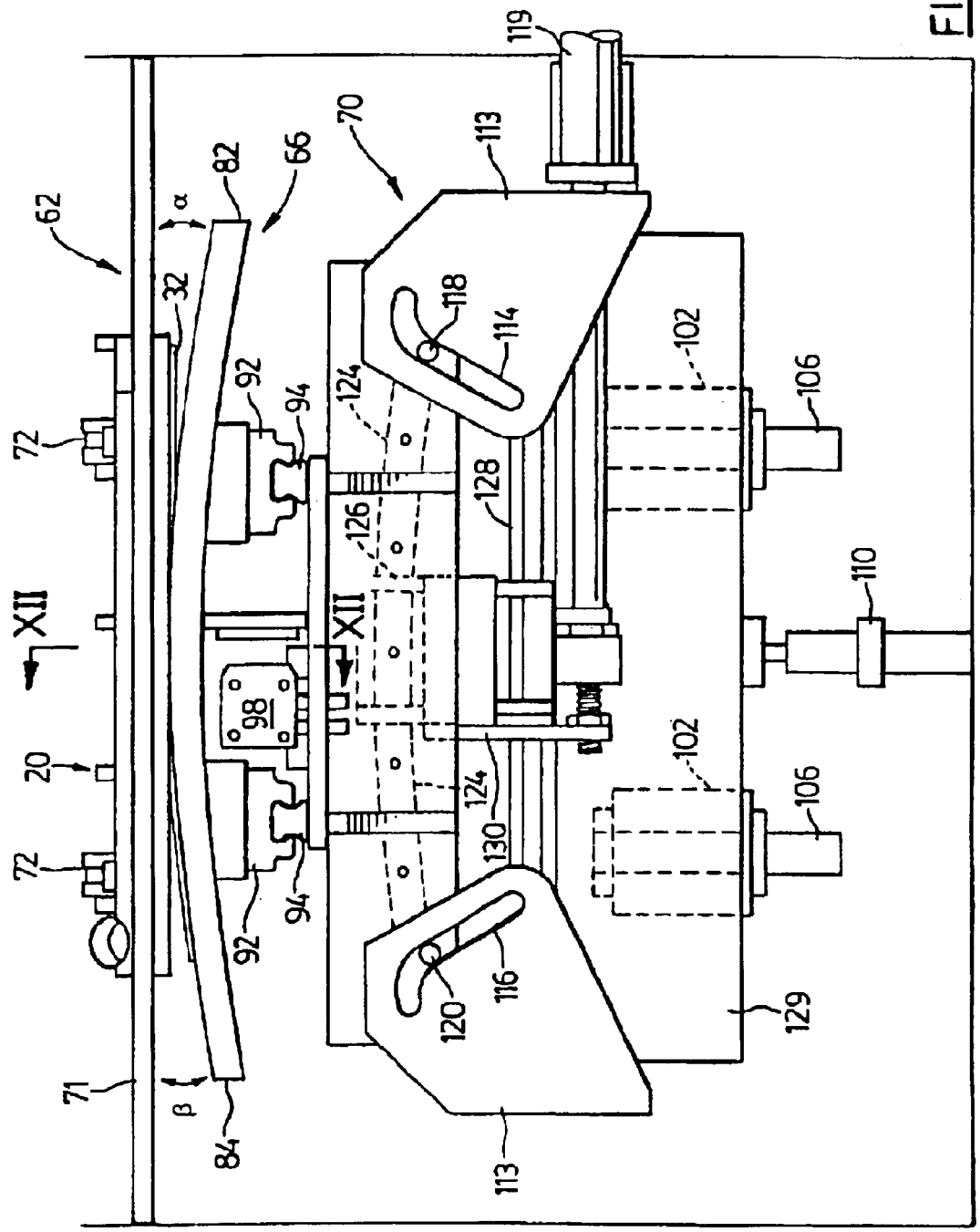
FIG. 10 is a front elevational view of the gasket assembly station shown in FIG. 8 with the gasket carrier in engagement with the centre of the valve cover.

Referring now to FIGS. 8–11, platen 129 is slidably mounted on frame 58 by runners 102 which slidably grasp rails 106. Lift cylinder 110 is mounted to base 54 and is operatively connected to pedestal 129, and acts as a first positioning means to effect movement of pedestal 129 between a lowered position and a gasket application position. The lowered position is best seen in FIG. 8, while FIGS. 9–10 show the gasket application position. As best seen in FIG. 9, in its retracted position cylinder 119 urges base 90 longitudinally such that pin 118 is in the curved end of guide slot 114, and pin 120 is in the straight end of guide slot 116. Accordingly, platform 88 is tilted such that first end 82 of gasket carrier 66 engages valve cover 20.

As shown in FIG. 10, as cylinder 119 extends pins 118, 120 will be guided by guide slots 114, 116 and will move platform 88 and gasket carrier 66 in an arcuate motion. Accordingly, gasket carrier 66 will "rock" along a point of contact between gasket carrier 66 and valve cover 20. In other words, a single point of tangential contact will translate along.

Figure 11:
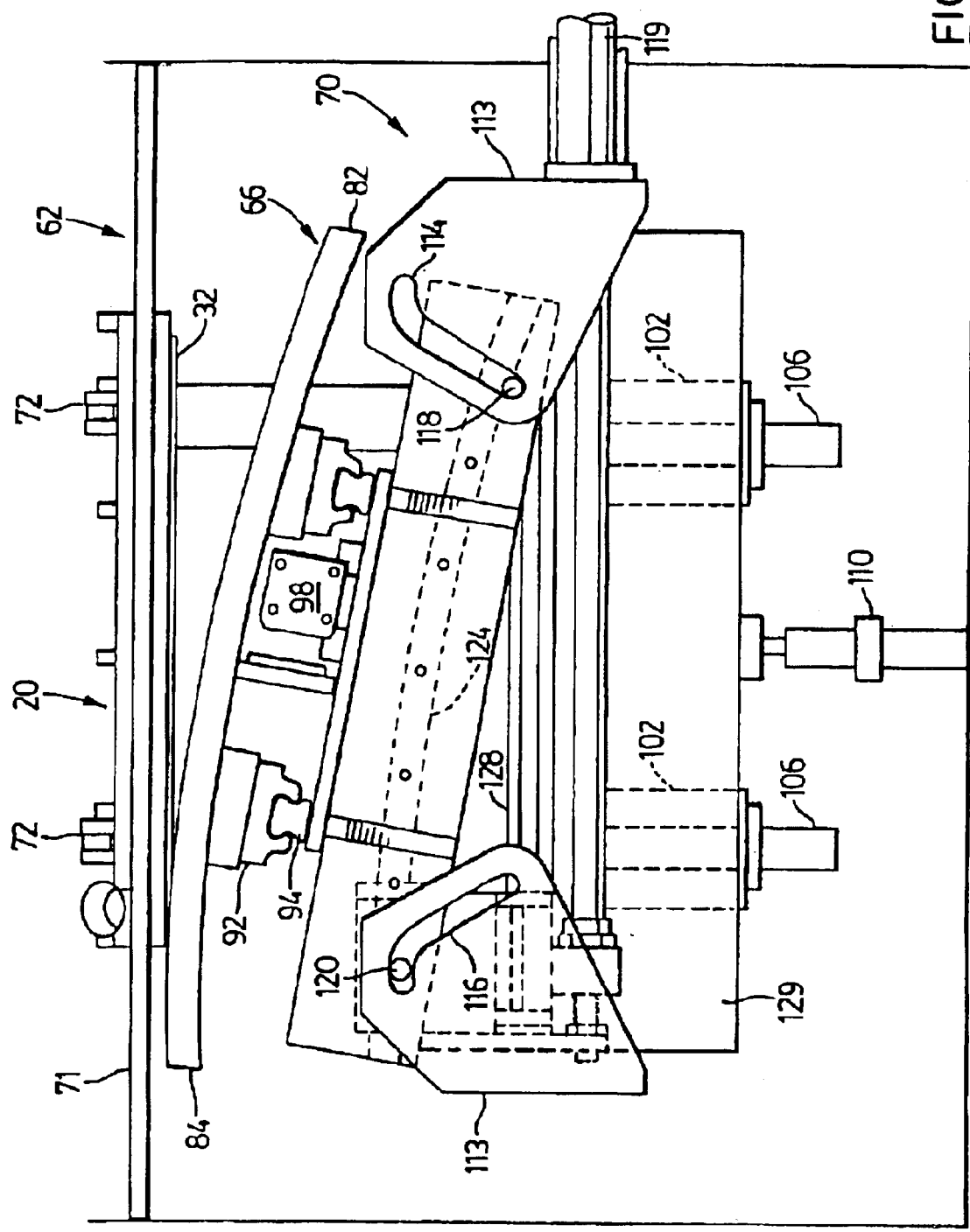
FIG. 11 is a front elevational view of the gasket assembly station shown in FIG. 9 with the gasket carrier in engagement with the opposite end of the valve cover.

As shown in FIG. 11, in the extended position cylinder 119 urges the platform such that pins 118, 120 will move to the opposite ends of guide slots 114, 116. Accordingly, platform 88 is canted such that second end 84 of gasket carrier 66 engages valve cover 20.

The operation of the present embodiment will now be explained with reference to the foregoing and FIGS. 1–12. Gasket carrier 66 is in the load position as illustrated in FIG. 6, laterally clear of part holder 62. An operator places valve cover 20 into opening 76, such that the periphery of cover 20 rests on the flange 73. The operator places gasket 32 into groove 78 such that bulbous portion 34 is releasably received within groove 78, and insertion flange 36 is presented upwardly.

The operator then moves outside of frame 58 and actuates the start of a sequence of automatic operations in apparatus 50 through any suitable actuation means such as a pair of push buttons connected in a series which provide a signal to a controller unit such as programmable logic controller (PLC). It will be understood that other actuation means and controller units can be provided, and that such variations do not depart from the scope of the present invention.

The controller unit then executes the following sequence of events to install gasket 32 into the channel 28 of cover 20. First, swing clamps 72 are actuated to move to the hold position to secure cover 20 within part holder 62. Next, cylinder 98 is extended to move carrier 66 from the load position into the ready position so as to align the gasket 32 with channel 28 of cover 20. Next, lift cylinder 110 is extended from the lowered position to the gasket application position, thus moving plat 129 and carrier base 90 upwardly to insert the insertion flange 36 at the first end 82 of carrier 66 into the corresponding portion of channel 28 (FIG. 9). As best seen in FIGS. 10–11, cylinder 119 then moves from the retracted position to the extended position and platform 88 responsively moves in a guided manner to produce a rocking motion. As the platform 88 moves in the rocking motion, the carrier 66 will move along the valve cover 20 thereby rocking the curved surface of carrier 136 along channel 28 and pushing the remainder of the gasket 32 into the corresponding portions of channel 28. The insertion of gasket 20 is best seen in FIG. 12.

Having completed the installation, lift cylinder 110 is retracted into the lowered position to move carrier 66 away from the valve cover 20. Cylinder 119 is then moved into an intermediate position, wherein the carrier 66 is generally level. Cylinder 98 then moves carrier 66 from the ready position in to the load position. Clamps 72 move to the release position, thereby allowing the removal of cover 20 with gasket 32 installed.

While the foregoing illustrates an operative sequence of operation, it will be apparent to persons skilled in the art that the exact sequence can vary, and that such variations do not depart from the scope of the present invention. For example, the gasket applicator can be a simple hand-held interface to manually rock the gasket carrier along the cover. Alternately, the gasket carrier can be stationary while the cover is rocked along the surface of gasket carrier.

It is apparent to those skilled in the art that the apparatus of the present invention may be ganged together in a back-to-back fashion. A back-to-back arrangement would facilitate the gasket installation process for installing gaskets for right and left-hand valve covers for a V-8 engine.

It will be apparent from the discussion above that the present invention provides a novel gasket installation apparatus by providing a gasket carrier having a curved surface which releasably receives and orients a gasket, and presents an insertion flange for insertion into a channel of a part. The carrier can be rocked relative to and along the channel to sequentially urge the gasket into the channel. The use of a gasket carrier having a curved surface ensures that portions of the gasket are properly inserted into the channel. The insertion can be accomplished in a very short period of time, thereby increasing productivity while ensuring proper insertion of the gasket. Additionally, the present invention could also be used with other shapes of gaskets, including non-endless gaskets.

It will now be apparent to persons skilled in the art that the present invention can be directed to apply gaskets to parts other than valve covers and cylinder heads, and that the present invention can be used for insertion of elastomeric gaskets into channels in a wide variety of parts including pumps, timing covers and other components, automotive and non-automotive alike.

We claim:

1. A method for applying an elastomeric gasket to apart having a channel extending into a face thereof for receiving and at least frictionally engaging said gasket, said method comprising the steps of:
   i) obtaining a gasket carrier having a convexly curved surface with a groove for receiving a base of said gasket, said groove being registrable with said channel;
   ii) placing said base of said gasket in said groove;
   iii) juxtaposing said face of said part and said gasket carrier with said gasket aligned with said channel;
   iv) moving said part and said gasket carrier toward each other for a portion of said gasket to enter said channel;
   v) causing a relative rocking movement between said part and said gasket carrier to transfer a remainder of said gasket to said channel; and,
   vi) separating said part and said gasket carrier.

2. A method according to claim 1 wherein:
   in step iv), said part is held stationary and said curved surface of said gasket carrier is moved toward said part; and,
   in step v), said part is held stationary and said relative rocking movement is carried out by said gasket carrier.

3. A method according to claim 1 wherein:
   in step iv), said curved surface of said gasket carrier is held stationary and said part is moved toward said curved surface; and,
   in step v), said curved surface is held stationary and said relative rocking movement is applied to said part.

4. A method according to claim 1 wherein:
   in step iv), said part is held stationary and said curved surface of said gasket carrier is moved toward said part; and, in step v), said curved surface is held stationary and said relative rocking movement is carried out by said gasket carrier.

5. An apparatus for applying an elastomeric gasket to a part having a channel extending into a face thereof for receiving and at least frictionally engaging said gasket, said apparatus comprising:

a gasket carrier having a convexly curved surface with a groove therein for receiving a base of said gasket;

said groove registering with said channel to feed said gasket into said channel in response to relative rocking movement between said part and said surface.

6. An apparatus as claimed in claim 5 further comprising:

a part holder for grasping said part and presenting said channel to said gasket carrier.

7. An apparatus as claimed in claim 6 further comprising:

a driver operably connected to at least one of said part holder and said gasket carrier for effecting said relative rocking movement.

8. An apparatus according to claim 7 wherein:

said driver is connected to said gasket carrier.

9. An apparatus according to claim 5 wherein:

said driver is connected to said part holder.

10. An apparatus according to claim 8 wherein said part holder includes:

an opening for receiving said part;

an inwardly extending flange extending at least part way around said opening for abutting against said face outboard of said channel to support said part within mid opening;

and, at least one clamp member moveable between a load position allowing placement and removal of said part within said opening and a bold position engaging said part to hold said part within said opening and against said flange.

11. An apparatus as claimed in claim 10 wherein said driver further comprises:

a platen moveable in a longitudinal direction toward and away from said part holder;

a base plate rockingly coupled to said platen for supporting said gasket carrier;

a connector for connecting said gasket carrier to said base plate;

first positioning means connected to said platen for moving said platen in said longitudinal direction; and, a rocker acting between said base plate and said platen for causing said base plate and in turn said gasket carrier to effect said rocking movement relative to said part holder.

12. An apparatus as claimed in claim 1 wherein said rocker further comprises:

first and second cam plates extending from said platen respectively toward first and second ends thereof;

said first and second cam plates having respective first and second cam surfaces engaged by respective first and second cam followers connected to said base plate;

said first and second cam surfaces being profiled to allow opposite relative longitudinal movement of said first and second ends of said base plate while restraining lateral movement thereof;

an arched guide secured to and extending laterally across said base plate, said arched guide having a curvature complementary to said curved surface; and, a slider slidable along said guide by a slider positioning means acting between said slider and said platen, to laterally position said slider relative to said guide, said slider acting in conjunction with said first and second cam plates and said first and second cam followers to translate lateral movement of said slider to said rocking movement of said gasket carrier.

13. An apparatus as claimed in claim 12 wherein:

said gasket carrier is slidably connected to said base plate for lateral movement relative to said part holder, and, said apparatus further includes a second positioning means acting between said platen and said base plate to laterally slide said platen clear of said part holder for placement of said gasket in said groove.

14. An apparatus as claimed in claim 13 wherein:

said first, second and slider positioning means are fluid pressure responsive cylinders.

15. An apparatus as claimed in claim 8 wherein said driver further comprises:

a platen moveable in a longitudinal direction toward and away from said part holder;

a base plate rockingly coupled to said platen for supporting said gasket carrier;

a connector for connecting said gasket carrier to said base plate;

first positioning means connected to said platen for moving said platen in said longitudinal direction; and, a rocker acting between said base plate and said platen for causing said base plate and in turn said gasket carrier to effect said rocking movement relative to said part holder.

16. An apparatus as claimed in claim 15 wherein said rocker further comprises:

first and second cam plates extending from said platen respectively toward first and second ends thereof;

said first and second cam plates having respective first and second cam surfaces engaged by respective first and second cam followers connected to said base plate;

said first and second cam surfaces being profiled to allow opposite relative longitudinal movement to said first and second ends of said base plate while restraining lateral movement thereof;

an arched guide secured to and extending laterally across said base plate, said arched guide having a curvature complementary to said curved surface; and, a slider slidable along said guide by a slider positioning means acting between said slider and said platen, to laterally position said slider relative to said guide, said slider acting in conjunction with said first and second cam plates and said first and second cam followers to translate lateral movement of said slider to said rocking movement of said gasket carrier.

17. An apparatus as claimed in claim 16 wherein:

said gasket carrier is slidably connected to said base plate for lateral movement relative to said part holder; and, said apparatus further includes a second positioning means acting between said platen and said base plate to laterally slide said platen clear of said part holder for placement of said gasket in said groove.

18. An apparatus as claimed in claim 17 wherein:

said first, second and slider positioning means are fluid pressure responsive cylinders.

19. An apparatus as claimed in claim 17 wherein:

said first, second and slider positioning means are pneumatic cylinders.

20. An apparatus as claimed in claim 13 wherein:

said first, second and slider positioning means are pneumatic cylinders.

* * * * *

UNITED STATES PATENT AND TRADEMARK OFFICE
CERTIFICATE OF CORRECTION

PATENT NO. : 6,848,161 B1
DATED : February 1, 2005
INVENTOR(S) : Folino et al.

It is certified that error appears in the above-identified patent and that said Letters Patent is hereby corrected as shown below:

Column 1,
Line 4, "Dec. 10" should be -- Feb. 10. --
Line 45, "SD" should be -- so. --
Line 48, after "gasket" and before "v)", insert -- This application is a 371 of PCT/CA00/00128 filed 02/10/2000, and claims benefit of 60/119,390 filed 02/10/1999. --
Line 52, insert:

-- U.S. Pat. No. 5,634,644 employs a two part elastromeric gasket whereby the mating metal part is subjected to induction heating and one section of the gasket is melted and glued into place. Disadvantages to this approach include the need for additional induction heating apparatus, and the requirement of a complicated gasket design whereby the two gasket sections have different compositions but complementary shapes that snap fit together.

Similarly, U.S. Pat. No. 5,513,855 also employs a multi-section gasket, but with a far more complicated design, with three metal plates sandwiched together with engaging tabs that bend against a dowel or bolt when the gasket is placed on an engine cylinder block. U.S. Pat. No. 4,783,087 employs an insert with deformable tabs that engage the gasket. U.S. Pat. No. 4,730,836 also uses an insert with barbs that deform when a retaining bolt is tightened. All of these designs require complicated gasket designs with deformable metal or plastic tabs that frictionally engage an engine part, and are not applicable to the installation of simple elastromeric gaskets into an endless channel prior to final assembly of mating parts.

Summary of Invention

A method is provided for applying an elastromeric gasket to a part having a channel extending into a face thereof for receiving and at least frictionally engaging said gasket, said method comprising the steps of:

i) obtaining a gasket carried having a convexly curved surface with a groove for receiving a base of said gasket, said groove being registrable with said channel;

ii) placing said base of said gasket in said groove;

iii) juxtaposing said face of said part and said gasket carrier with said gasket aligned with said channel;

iv) moving said part and said gasket carrier toward each other for a portion of said gasket to enter said channel;

v) causing a relative rocking movement between said part and said gasket carrier to transfer a remainder of said gasket to said channel; and, vi) separating said part and said gasket carrier.

According to one embodiment of the present invention, the part may be held stationary in step iv) and the arched surface with the gasket thereon moved toward the part and in step v), the part may be held stationary and the relative rocking movement carried out by the gasket carrier. --

UNITED STATES PATENT AND TRADEMARK OFFICE
CERTIFICATE OF CORRECTION

PATENT NO. : 6,848,161 B1
DATED : February 1, 2005
INVENTOR(S) : Folino et al.

It is certified that error appears in the above-identified patent and that said Letters Patent is hereby corrected as shown below:

Column 4,
Line 8, between "11°" and "about 22°", insert -- to --.

Column 5,
Line 45, "plat" should be -- platen. --

Column 6,
Line 34, "apart" should be -- a part. --

Column 7,
Line 34, "bold" should be -- hold. --
Line 51, "claim 1" should be -- claim 11. --

Signed and Sealed this

Thirty-first Day of May, 2005

JON W. DUDAS
*Director of the United States Patent and Trademark Office*